United States Patent
Chen

(10) Patent No.: US 7,227,703 B2
(45) Date of Patent: Jun. 5, 2007

(54) ASPHERIC LENS AND METHOD FOR MAKING SAME

(75) Inventor: Ga-Lane Chen, Fremond, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 11/136,788

(22) Filed: May 25, 2005

(65) Prior Publication Data
US 2006/0001983 A1    Jan. 5, 2006

(30) Foreign Application Priority Data
Jul. 2, 2004    (CN) ................... 2004 1 0027985

(51) Int. Cl.
G02B 3/02    (2006.01)
G02B 3/00    (2006.01)
B29D 11/00   (2006.01)

(52) U.S. Cl. .................. 359/718; 359/708; 264/1.32; 264/1.1

(58) Field of Classification Search ............. 264/1.1, 264/1.32, 1.7, 207; 359/708, 718, 719; 425/808
See application file for complete search history.

(56) References Cited

U.S. PATENT DOCUMENTS

| | | | | |
|---|---|---|---|---|
| 3,980,399 A | * | 9/1976 | Howden | 359/718 |
| 4,319,945 A | * | 3/1982 | Howden | 156/212 |
| 4,432,832 A | * | 2/1984 | Fantone | 216/24 |
| 4,738,516 A | * | 4/1988 | Verhoeven et al. | 359/718 |
| 5,400,182 A | * | 3/1995 | Chiba | 359/718 |
| 5,643,504 A | * | 7/1997 | Chiba | 264/1.7 |
| 5,718,849 A | * | 2/1998 | Maus et al. | 264/2.2 |
| 7,070,862 B1 | * | 7/2006 | Miyakawa et al. | 428/425.6 |
| 2002/0064575 A1 | * | 5/2002 | Miyakawa et al. | 425/470 |
| 2004/0262791 A1 | * | 12/2004 | Sidhu et al. | 264/1.31 |
| 2005/0275954 A1 | * | 12/2005 | Bloemen et al. | 359/719 |
| 2006/0012889 A1 | * | 1/2006 | Kojima et al. | 359/741 |

* cited by examiner

Primary Examiner—David N. Spector
(74) Attorney, Agent, or Firm—Morris Manning & Martin LLP; Tim Tingkang Xia, Esq.

(57) ABSTRACT

An aspheric lens (1) includes a substrate (10) and an aspheric film (12). The substrate (10) is made of glass, and has a spherical surface (102). The aspheric film (12) is formed on a surface of the substrate (10), and is made of plastic material. The aspheric film (12) has an aspheric surface (122). A method for making the aspheric lens (1) includes the steps of: providing a substrate (10) made of glass, the substrate (10) having a spherical surface (102); putting the substrate (10) in an injection mold, the injection mold having an aspheric surface (202); closing the injection mold, and injecting a plastic material on the substrate (10); solidifying the plastic material, thereby forming an aspheric film (12) on the substrate (10); and opening the injection mold, and obtaining the aspheric lens (1).

12 Claims, 1 Drawing Sheet

ASPHERIC LENS AND METHOD FOR MAKING SAME

FIELD OF THE INVENTION

The present invention generally relates to lenses such as those used in portable electronic devices, and more particularly to aspheric lenses.

BACKGROUND

Currently, digital camera modules are included as a feature in a wide variety of portable electronic devices. Most portable electronic devices are becoming progressively more miniaturized over time, and digital camera modules are correspondingly becoming smaller and smaller. Nevertheless, in spite of the small size of a contemporary digital camera module, consumers still demand excellent imaging. The image quality of a digital camera is mainly dependent upon the optical elements of the digital camera module.

Aspheric lenses are very important elements in the digital camera module. An aspheric lens can easily focus an image on an imaging point, because the aspheric lens can attain different refractive index by means of selected different materials and profiles. Therefore an aspheric lens can avoid many of the image-forming problems of spherical lenses. In addition, with a single aspheric lens, the number of lens pieces in the camera can be reduced. Thus the cameras can have reduced size. Two or more aspheric lenses are used in some cameras for high quality image forming. Contemporary aspheric lenses are made of plastic or glass. Glass aspheric lenses are generally manufactured by way of glass molding. A glass molding machine operates at a high temperature and high pressure during the glass molding process. Therefore the cost of glass aspheric lenses is relatively high. Plastic aspheric lenses are generally manufactured by way of injection molding. Though the cost of plastic aspheric lenses is relatively low, the plastic aspheric lens has low image-forming quality compared to a glass aspheric lens. This is because the transparency of the plastic is lower than that of glass.

What is needed is an inexpensive aspheric lens which provides high image-forming quality in camera.

SUMMARY

An aspheric lens includes a substrate and an aspheric film. The substrate is made of glass, and has a spherical surface. The aspheric film is formed on a surface of the substrate, and is made of plastic material. The aspheric film has an aspheric surface.

A method for making an aspheric lens comprises the steps of: providing a substrate made of glass, the substrate having a spherical surface; putting the substrate in a injection mold, the injection mold having an aspheric surface; closing the injection mold, and injecting a plastic material on the substrate; solidifying the plastic material, forming an aspheric film on the substrate; opening the injection mold, and getting an aspheric lens.

Other objects, advantages and novel features will become more apparent from the following detailed description when taken in conjunction with the accompanying drawings, in which:

DETAILED DESCRIPTION OF PREFERRED EMBODIMENTS

Figure 1:
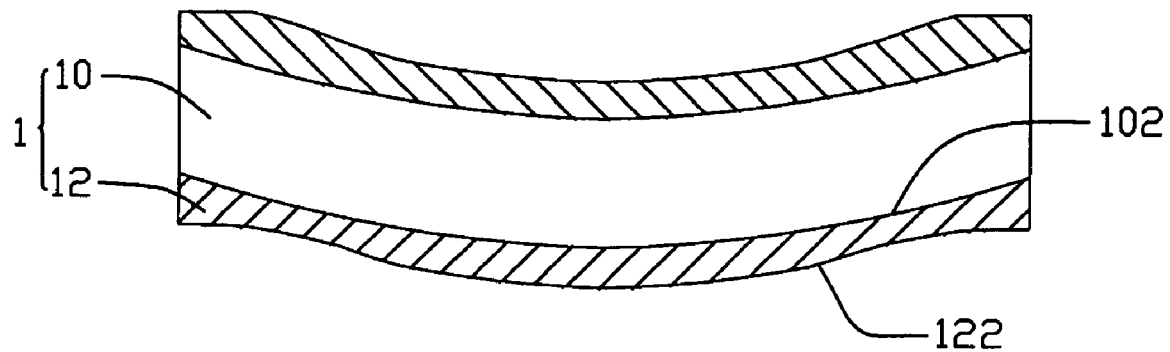
FIG. 1 is a cross-sectional view of an aspheric lens in accordance with a preferred embodiment of the present invention.

Referring to FIG. 1, in a preferred embodiment of the present invention, an aspheric lens 1 comprises a substrate 10 as its main portion and an aspheric film 12. The aspheric film 12 is formed on a spherical surface 102 of the substrate 10. The substrate 10 is made of glass material. Therefore the substrate 10 can be obtained at an economical price. Further, the substrate 10 can be made by means of finishing or whetting. The aspheric film 12 has an aspheric surface 122. The aspheric film 12 is made of transparent plastic material such as polycarbonate, polymethyl methacrylate, or a combination thereof. The substrate 10 and the aspheric film 12 preferably have the same refractive index, for optimal image-forming quality. The aspheric film 12 is preferably relatively thin, because plastic material has lower transparency than glass material. Therefore the width of the aspheric film 12 is preferably 10–900 microns, and even more preferably 50–500 microns.

Figure 2:
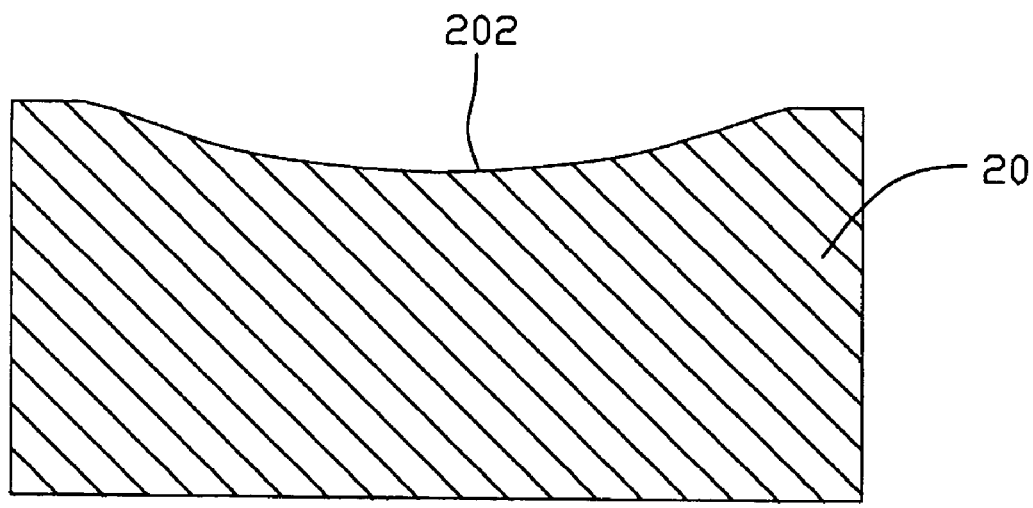
FIG. 2 is a cross-sectional view of an injection mold in accordance with a preferred embodiment of the present invention, the injection mold being used to make the aspheric lens of FIG. 1.

Referring also to FIG. 2, in a preferred embodiment of the present invention, a method for making an aspheric lens comprises the steps of:

(1) providing a substrate 10 made of glass material, the substrate 10 being made by means of ordinary surface treating method;

(2) providing an injection mold including a core insert 20, the core insert 20 having an aspheric surface 202 and being made of a material selected from the group consisting of stainless steel, high rigidity steel, nickel phosphide (NiP), and any combination thereof;

(3) cleaning the substrate 10, and putting the substrate 10 in the injection mold;

(4) closing the injection mold, and injecting transparent plastic material such as polycarbonate or polymethyl methacrylate in the injection mold, wherein the operational temperature is 100–300° C., and the operational pressure is 200–100 newton;

(5) solidifying the plastic material with ultraviolet light, thus forming an aspheric film 12 on a spherical surface 102 of the substrate 10; and (6) cooling the injection mold, thereby obtained the aspheric lens 1.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An aspheric lens, comprising:
    a substrate made of glass, the substrate including a spherical surface; and
    an aspheric film formed on the spherical surface of the substrate, the aspheric film being made of plastic and having the same refractive index as that of the substrate, and the aspheric film comprising an aspheric surface, the aspheric film is injected to form on the spherical surface of the substrate by placing the substrate in an injection mold.

2. The aspheric lens as claimed in claim 1, wherein the plastic is a material selected from the group consisting of polycarbonate and polymethyl methacrylate, and any combination thereof.

3. The aspheric lens as claimed in claim 1, wherein the aspheric film has a thickness in the range of 10–900 microns.

4. A method for making an aspheric lens, comprising the steps of:
   providing a substrate made of glass;
   putting the substrate in an injection mold, the injection mold having an aspheric surface;
   closing the injection mold, and injecting a plastic material on the substrate;
   solidifying the plastic material, thereby forming an aspheric film on the substrate; and
   opening the injection mold, and obtaining the aspheric lens.

5. The method according to claim 4, wherein the injection mold has a core insert, and the core insert has an aspheric surface.

6. The method according to claim 5, wherein the core insert is made of a material selected from the group consisting of stainless steel, high rigidity steel, nickel phosphide, and any combination thereof.

7. The method according to claim 4, wherein the injection mold has an operational temperature in the range of 100–300° C.

8. The method according to claim 4, wherein the injection mold has an operational pressure in the range of 200–1000 newtons.

9. The method according to claim 4, wherein the plastic material is solidified by ultraviolet light.

10. A method for making an aspheric lens, comprising the steps of:
    forming a glass substrate as a main portion of said aspheric lens;
    placing said substrate in an injection mold having an aspheric surface therein; and
    injecting an aspheric film on a side of said glass substrate in said injection mold so as to define an aspheric surface on said film facing away from said glass substrate according to said aspheric surface of said injection mold.

11. The method according to claim 10, wherein said aspheric film is made of plastic selected from the group consisting of polycarbonate, polymethyl methacrylate, and any combination thereof.

12. The method as claimed in claim 10, wherein said aspheric film has the same refractive index as that of said substrate.

* * * * *